(12) United States Patent
Nagaram Chengal

(10) Patent No.: US 7,818,500 B2
(45) Date of Patent: Oct. 19, 2010

(54) APPARATUS AND METHOD FOR USING ONE CORE FOR RAID CONTROL IN MULTI-CORE CPU

(75) Inventor: Yamini Nagaram Chengal, Fremont, CA (US)

(73) Assignees: Pubali Ray, Newark, CA (US); Akila Baskaran, Round Rock, TX (US); Kawaldeep Kaursodhi, Fremont, CA (US)

( * ) Notice: Subject to any disclaimer, the term of this patent is extended or adjusted under 35 U.S.C. 154(b) by 452 days.

(21) Appl. No.: 11/982,267

(22) Filed: Nov. 1, 2007

(65) Prior Publication Data

US 2009/0119449 A1    May 7, 2009

(51) Int. Cl.
*G06F 12/00* (2006.01)
(52) U.S. Cl. ................ 711/114; 711/103; 711/E12.001
(58) Field of Classification Search ........................ None
See application file for complete search history.

(56) References Cited

U.S. PATENT DOCUMENTS

| 6,065,096 | A | 5/2000 | Day |
| 6,549,980 | B2 | 4/2003 | Landau |
| 6,904,497 | B1 | 6/2005 | Beckett |
| 2006/0224851 | A1 | 10/2006 | Tamura et al. |
| 2006/0248308 | A1 | 11/2006 | Wang et al. |
| 2007/0168399 | A1 | 7/2007 | Schultz |
| 2007/0185942 | A1 | 8/2007 | Hitz |
| 2007/0239932 | A1 | 10/2007 | Zimmer et al. |

*Primary Examiner*—Kevin Verbrugge

(57) ABSTRACT

The invention is based on running the entire RAID stack on a dedicated core of one of the cores of the multi-core CPU. This makes it possible to eliminate the use of a conventional separate RAID controller and replace its function with a special flash memory chip that contains a program, which isolates the dedicated cores from the rest of the operating system and converts it into a powerful RAID engine. A part of the memory of the flash memory chip can also be used for storing data at power failure. This makes it possible to avoid having the battery backup module. The invention of the method of RAID on multi-core CPU may have many useful applications on an enterprise level, e.g., for increased accessibility and preserving critical data.

17 Claims, 9 Drawing Sheets

Enterprise level RAID on Multi-Core CPU

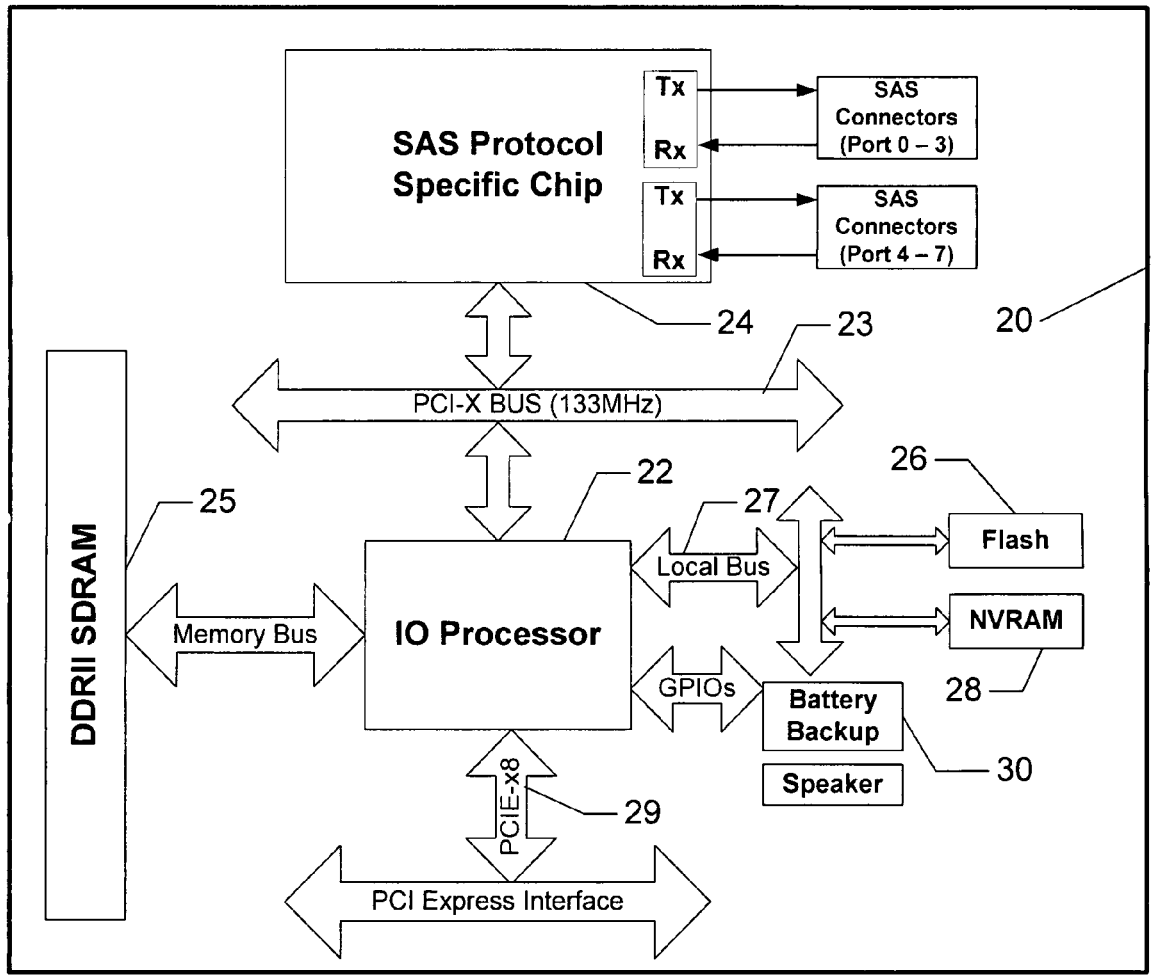
Figure 1: Hardware Design of I/O Processor based RAID Controller

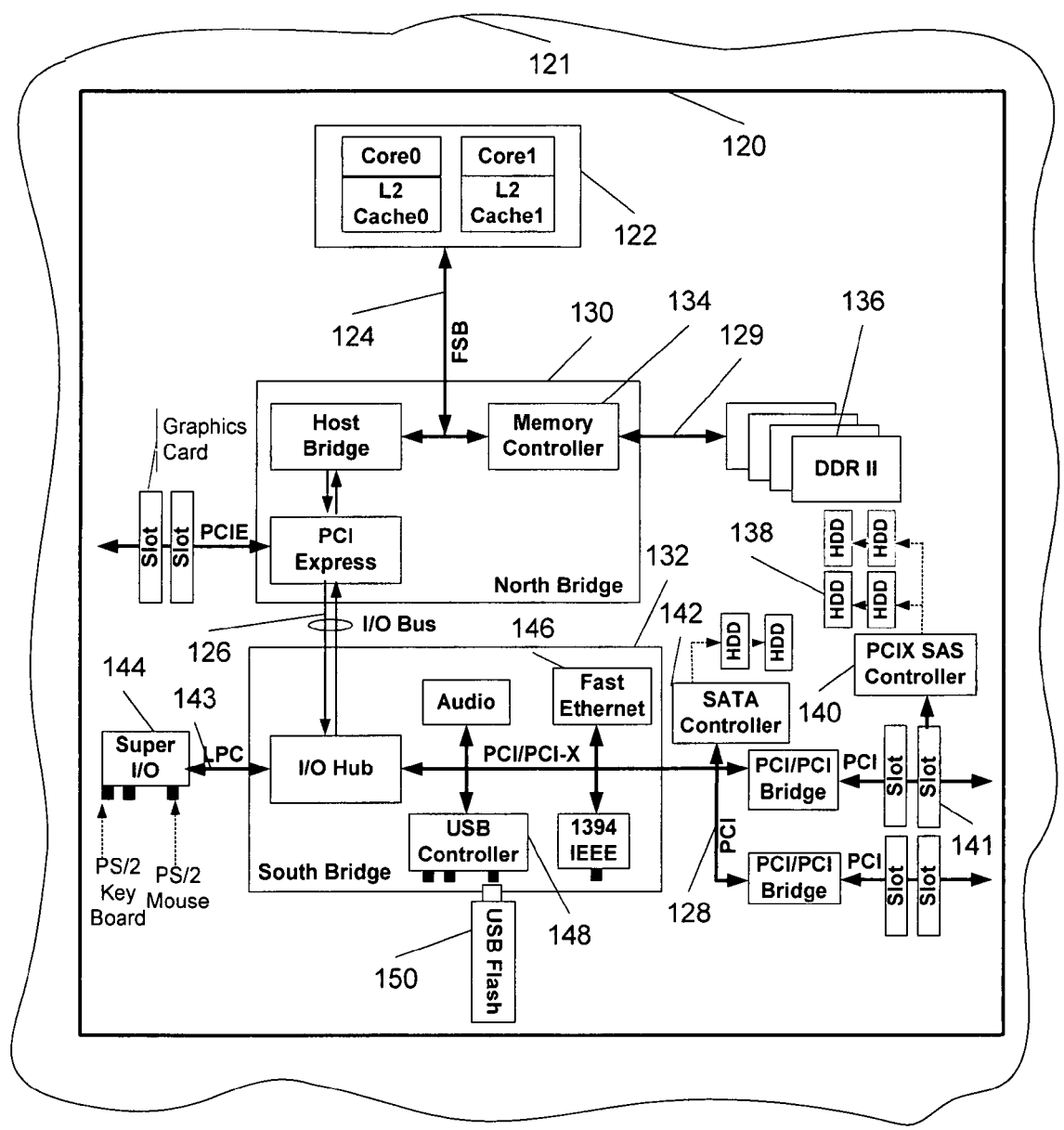
Figure 2: A typical Dual Core Mother Board available in the Market

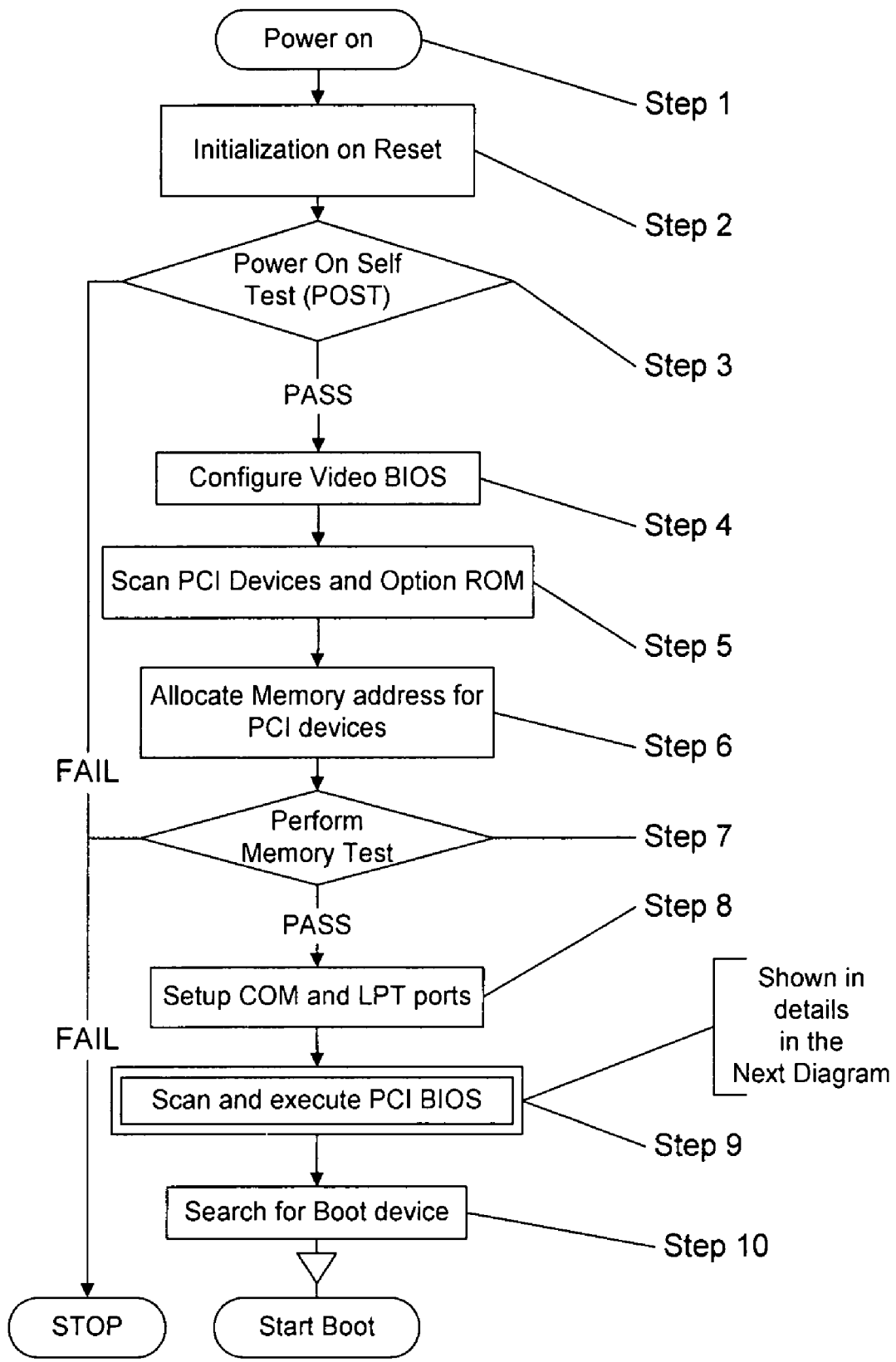
Figure 3: System Bios Boot sequence

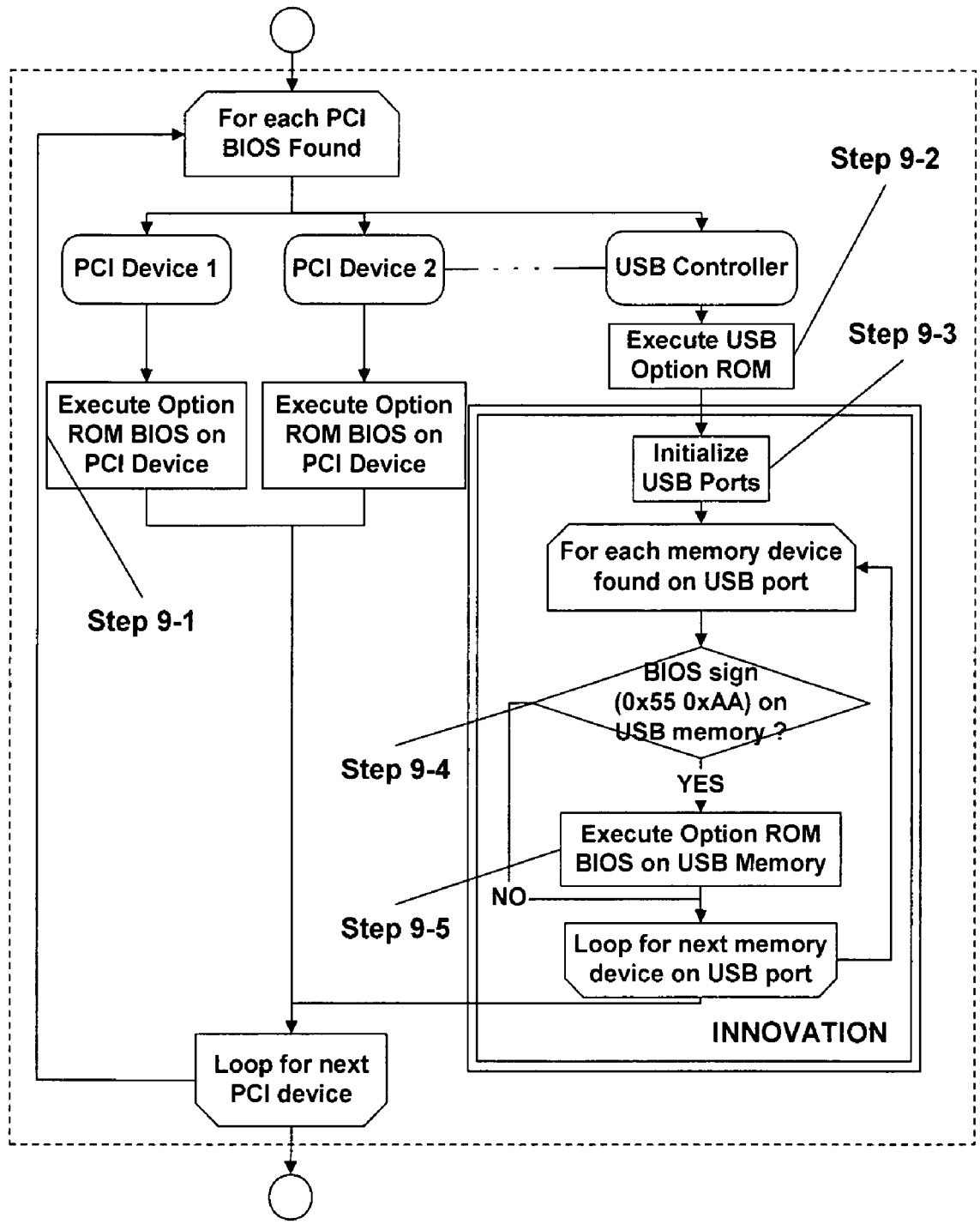
Figure 4: Details of BIOS PCI Scan

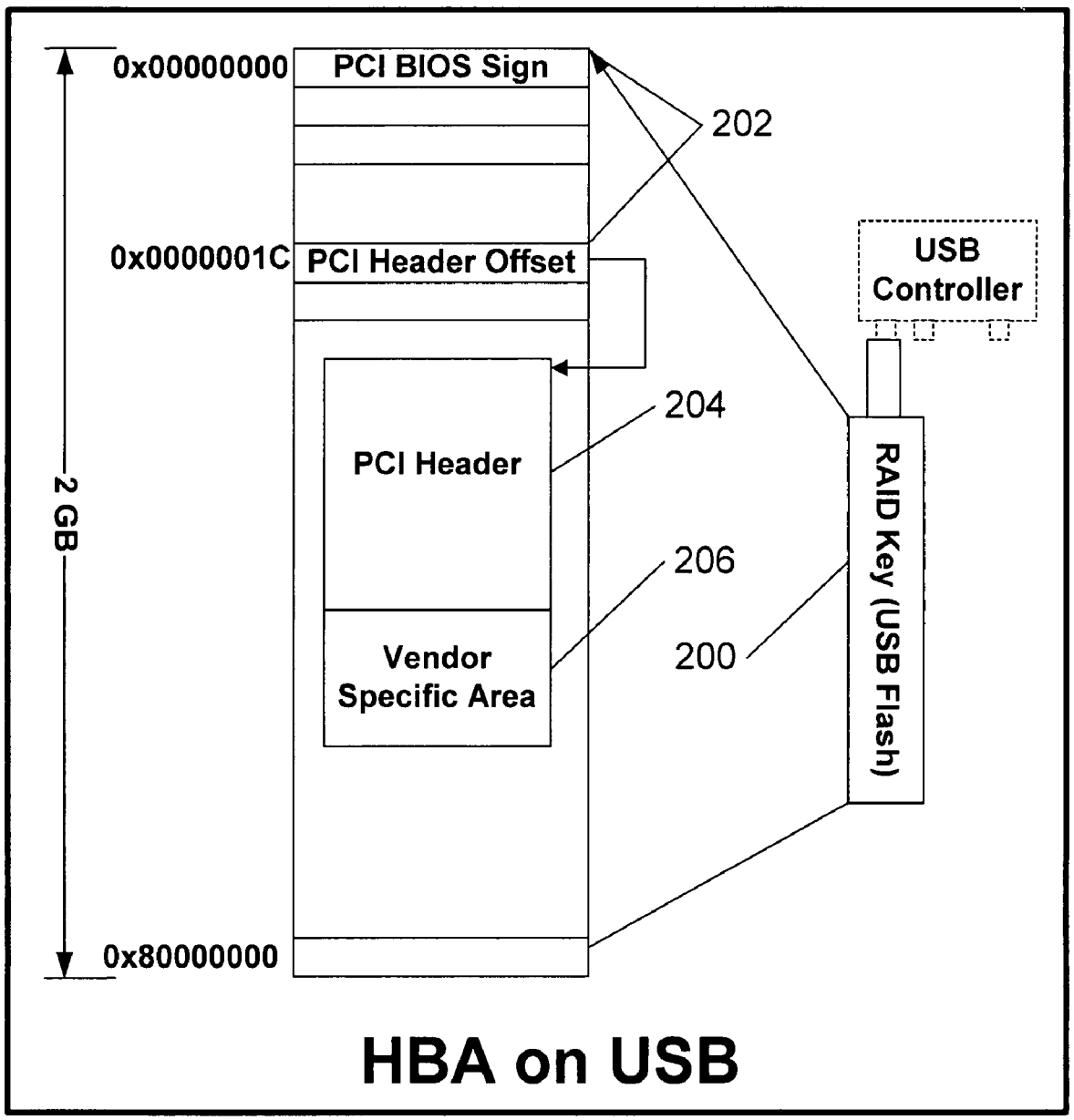
Figure 5: The proposed Architecture to present the USB Flash as a virtual PCI Device to the Host system

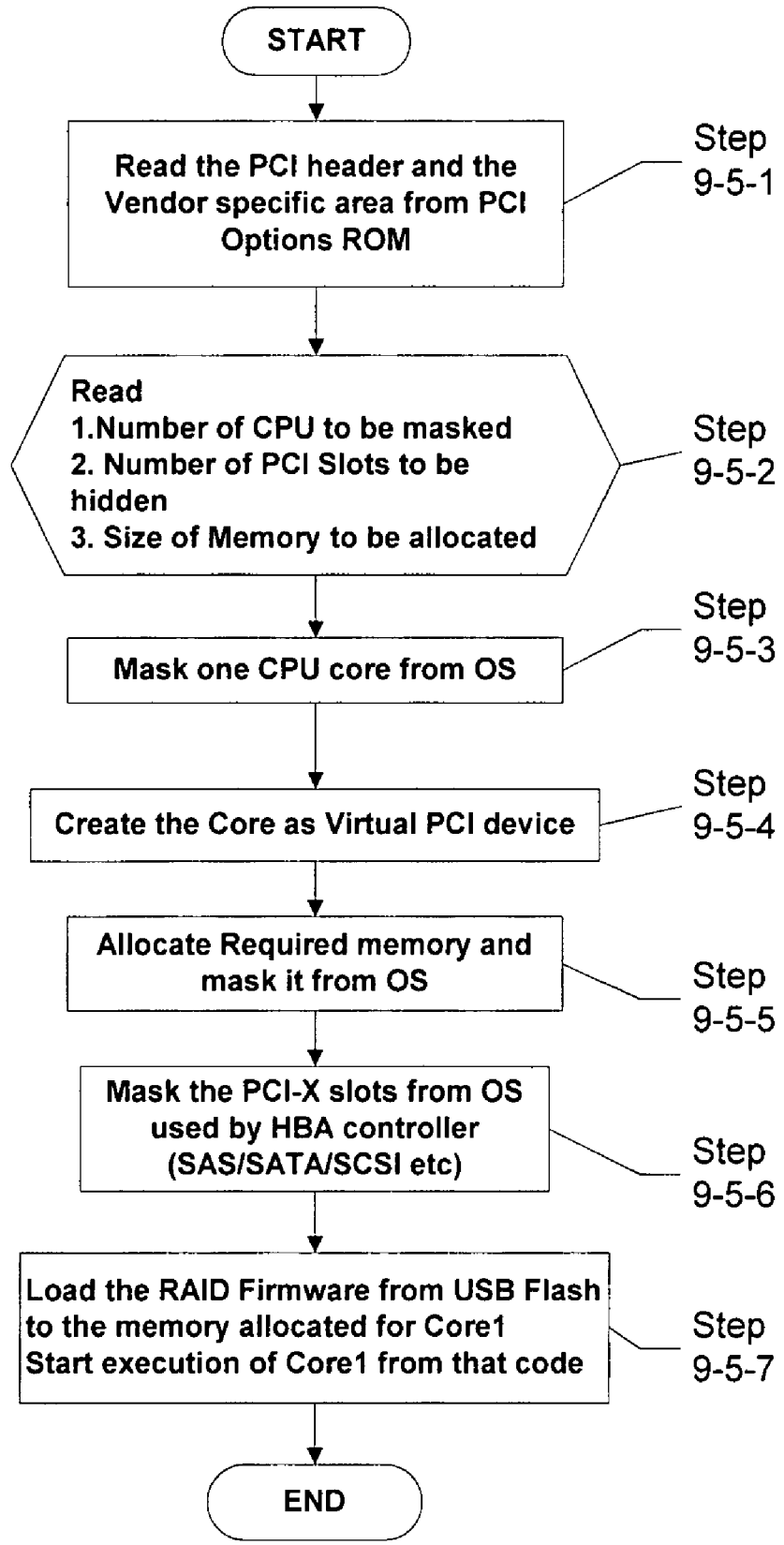
Figure 6: RAID BIOS Initialization Sequence

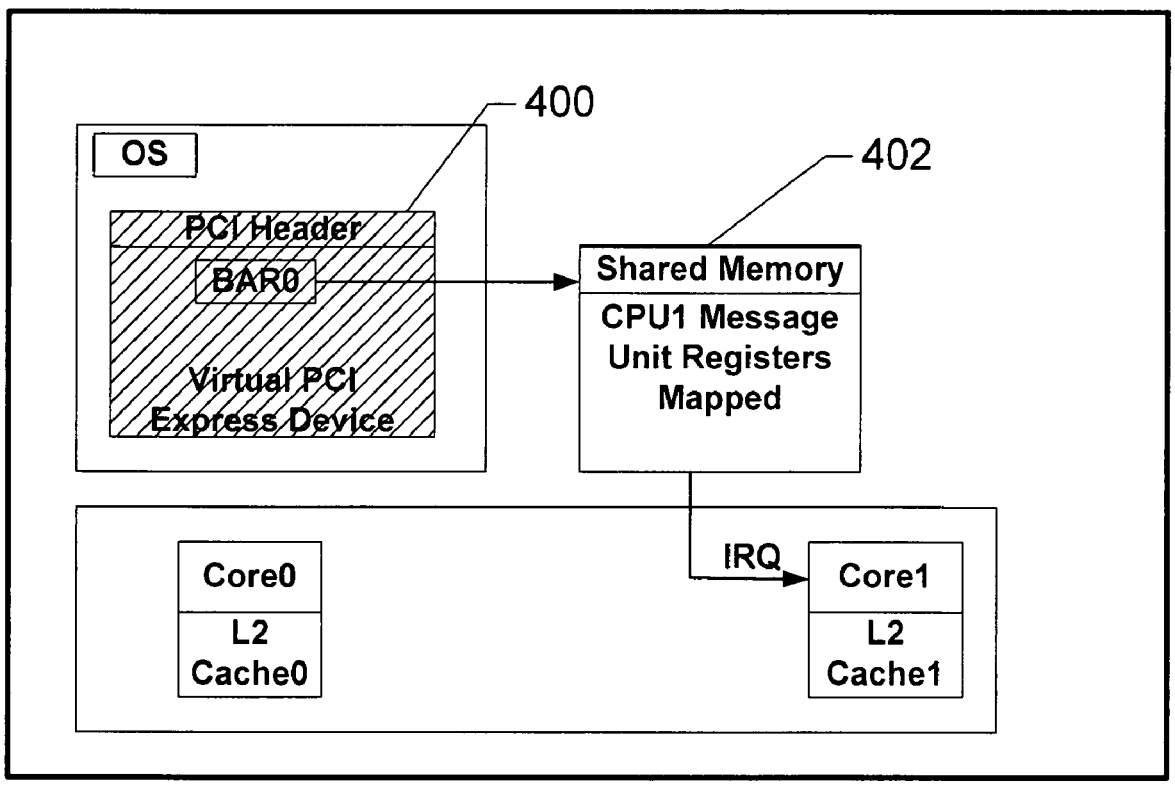
Figure 7: The proposed Host Driver interface to the RAID on CPU with a Virtual PCI Express device interface.

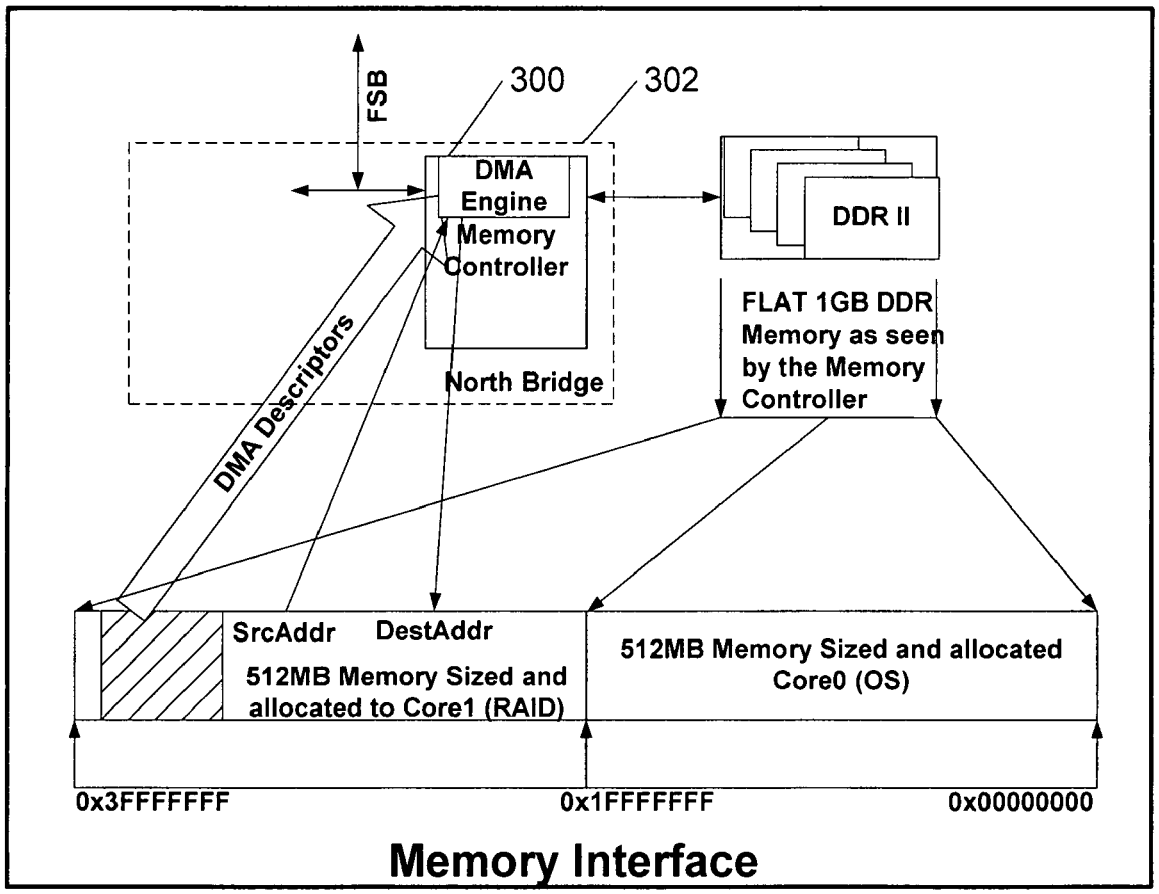
Figure 8: The proposed Memory Sizing for the RAID on CPU disk cache support.

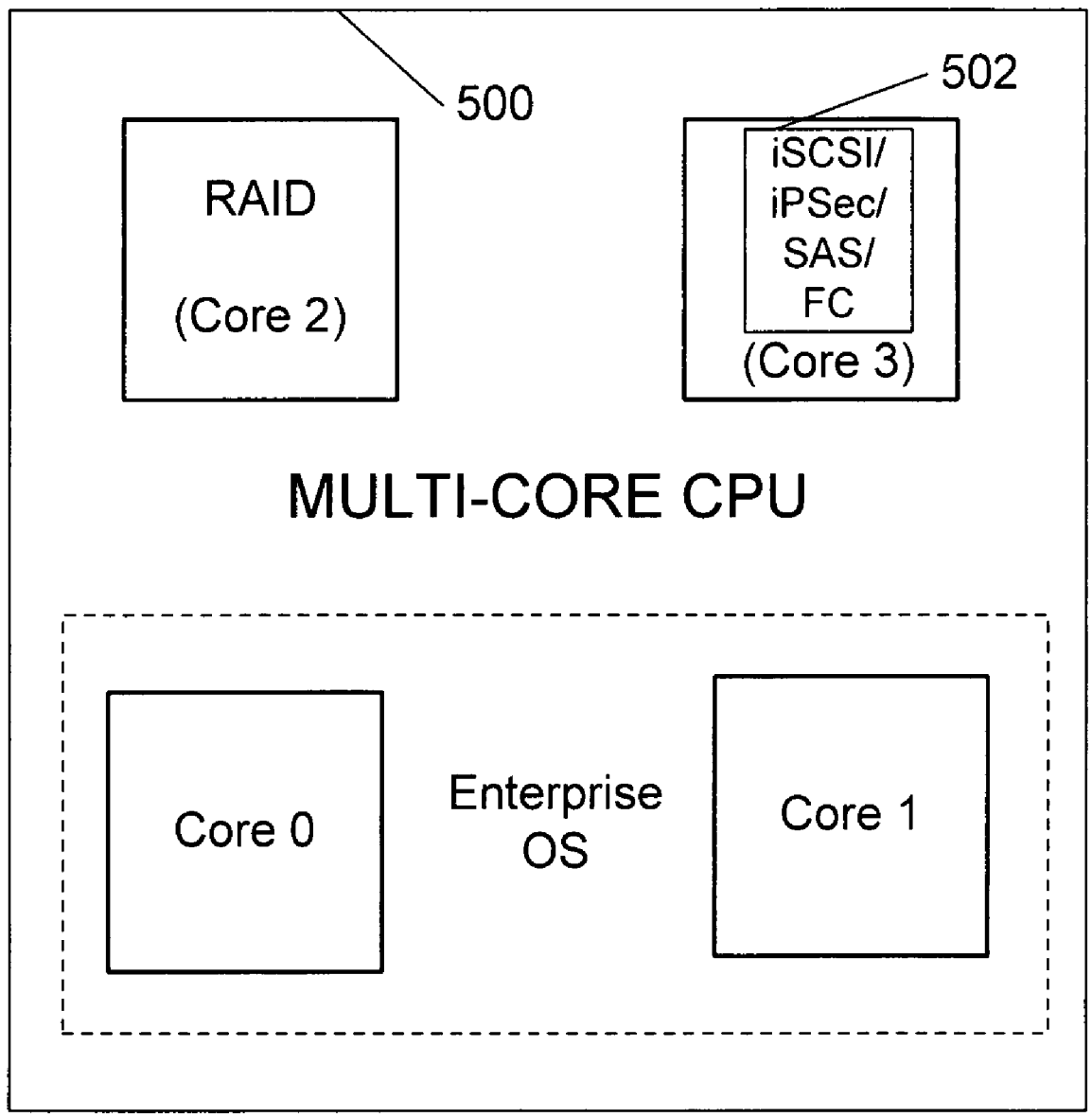
Figure 9: Enterprise level RAID on Multi-Core CPU

APPARATUS AND METHOD FOR USING ONE CORE FOR RAID CONTROL IN MULTI-CORE CPU

FIELD OF THE INVENTION

The present invention relates to the field of data storage devices, more particularly to redundant array of independent disks, and specifically to an apparatus and method for use of redundant array of independent disks (hereinafter referred to as RAID) on a multi-core central processing unit (hereinafter referred to as CPU) of a motherboard.

BACKGROUND OF THE INVENTION

The giant processor makers such as Intel and AMD are introducing dual-core and multi-core processors to meet the demanding processing power of the modern applications, since limitations of the current technology and designs prohibit further increase in processor speed.

For better understanding the principle of the present invention, it will be advantageous to give definition to some terms used in the present patent application.

A motherboard, which is also known as the logic board, main board, or computer board, is the computer's main board that holds all CPU, memory, and I/O functions or has expansion slots for them.

A processor core is the processing part of a CPU minus the cache. It is made up of the control unit and the arithmetic logic unit. A multi-core processor is an integrated circuit (IC) to which two or more processors have been attached for enhanced performance, reduced power consumption, and for more efficient simultaneous processing of multiple tasks. A dual-core CPU means that there are two complete execution cores per physical processor. It has two independent processors with dedicated caches and cache controllers onto a single die. One of the applications of dual-core processors is a multitasking environment. Since both cores have access to the front side bus (FSB), operating system (OS) can perform most computational intensive tasks in parallel. Multi-core processor is the extension of dual-core processor where multiple cores are present on the single die instead of only two.

The OS sitting on the server has to support multithreading to take advantage of the dual-core processor. This is one way to boost the system performance by taking advantage of the dual-core technology. Other way of improvement could be if we can dedicate one of the CPU cores to a particular computational intensive application like RAID and leave the other for running the OS with the user applications. This looks like an ideal situation for a multiple processor, because today the RAID application is almost a separate OS running on an I/O processor with its own resources.

The RAID, which is deciphered as Redundant Array of Independent Disks, i.e., as a disk subsystem that is used to increase performance or provide fault tolerance or both. RAID uses two or more ordinary hard disks and a RAID disk controller. RAID subsystems come in all sizes from desktop units to floor-standing models. Stand-alone units may include large amounts of caches as well as redundant power supplies. Initially used with servers, desktop PCs are increasingly being retrofitted by adding a RAID controller and extra SATA or Serial ATA (Advanced Technology Attachment) or SCSI (Small Computer System Interface, pronounced "skuzzy") disks. Newer motherboards often have RAID controllers.

A typical conventional multi-core CPU which consists of two or more processors put together on a single die which shares the same interconnect to the rest of the system is called a Multi-core CPU. Each core by itself has its own L1, L2 caches and may independently implement superscalar execution, pipelining, and multithreading.

Interconnection between two or more buses with different speeds and bandwidths on a motherboard is achieved using special controllers called bridges. A conventional multi-core system normally consists of a dual core CPU, North Bridge and South Bridge. The CPU is the heart of the computer motherboard. The data transfer between the CPU and other components like RAM (Random Access Memory), hard disk, etc., on the motherboard is performed via buses. Based on the amount of data that is to be handled by each component on the motherboard, there may be several buses on the motherboard.

The bus that is nearest to the CPU is the fastest bus known as the Front Side Bus (FSB), which connects RAM and CPU. The buses connecting the I/O devices are the slower buses. All the controllers connected to the fast buses are grouped together and put as one large chip that constitutes the aforementioned North Bridge, while the controllers connected to the slow buses are grouped together to make a large chip that constitutes the aforementioned South Bridge. The North Bridge and South Bridge together are called Chip set.

The basic function of the aforementioned RAID controller is to provide connectivity between a host computer and storage devices such as, e.g., hard disks. There are many ways in which RAID stack can be implemented.

Given below are several examples of use of RAID stacks, where only those elements and units that are essential for understanding the invention will be shown in the drawings and designated by reference numerals.

1) Hardware RAID Controller

This is the one of the best RAID solutions available in the market today. A data-exchange diagram of a hardware design of the I/O processor-based RAID controller that is used in the aforementioned product is shown in FIG. 1. As can be seen from FIG. 1, the I/O processor-based RAID controller, which as a whole is designated by reference numeral 20 consists of the following components: an I/O processor 22, which is connected to a DDRII (the abbreviation for Double Data Rate Two), a DDRII 25 which is a high-speed variant of synchronous dynamic random access memory (SDRAM) that is used in personal computers as well as in many other intelligent electronic devices) (not shown), a SAS (Serial Attached SCSI) protocol specific chip 24 to which the I/O processor 22 is connected through a PCI-X (Peripheral Component Interconnect Extended) bus 23, as well as a flash chip 26 and NVRAM (Non-Volatile Random Access Memory) 28 which are also connected to the I/O processor through the local bus 27.

Other components shown in FIG. 1 are the following: a PCI Express Interface linked to the I/O Processor 22 via PCIEx8 designated by reference numeral 29, battery backup 30 linked to the I/O Processor 22 via GPIOs (General Purpose Inputs/Outputs), etc.

2) RAID on Mother Board (ROMB):

The ROMB is good with respect to cost and performance but involves the same special hardware on the motherboard, like I/O processor, flash chip, NVRAM, special DDR circuitry, battery back up module etc.

3) RAID on Chip (ROC)

This solution is similar to Hardware solution except it uses a special chip that has both I/O processor and the backend device (SCSI/SAS/SATA) integrated into a single chip.

4) Software RAID

Software RAID is a RAID stack running as a driver. This approach is practical due to the fast processor that exists today in the market. But the disadvantage is that it consumes a significant part of the system resources and delays operation of the OS and thus impairs the performance of the system.

5) RAID on File System

A great number of file systems already implement RAID but do not have an opportunity of using key features of RAID subsystems such as Rebuild, RAID Level Migration (RLM), Online Capacity Expansion (OCE), Back Ground Initialization (BGI), Check Consistency, Enclosure Management, etc.

6) RAID on Virtual Machine (VM)

A Virtual Machine (VM) is a software implementation of a machine (computer) that executes programs like a real machine, using underlying hardware API's (where API is Application Program Interface) provided by the hardware of the virtual machine. In a multiple core environment, the RAID can be run on a Virtual Machine. But this approach of RAID implementation also incorporates delays in many API layers and queue delays of the multiple OS running on the multiple cores. Hence it hampers the total performance of the RAID subsystem, and may lead to other complications dealing with specific features of the OS.

Given below are some examples illustrating independent use of RAID and multi-core processors in computer systems.

US Patent Application Publication No. 20070239932 published in 2007 (inventor V. Zimmer, et al.) discloses a method that includes partitioning a plurality of core processors into a main partition comprising at least one processor core capable of executing an operating system and an embedded partition comprising at least one different processor core. The main partition and embedded partition may communicate with each other through a bridge. The embedded partition of this embodiment may be capable of: mapping two or more mass storage systems, coupled to the embedded partition, into a single logical device; presenting the logical device to the bridge; and receiving at least one I/O request, generated by the main partition and directed to the logical device, and in response to the I/O request, the embedded partition may be further capable of communicating with at least one of the two or more mass storage systems using at least one communication protocol to process said I/O request; and reporting the status of the I/O request to the main partition, via the bridge.

US Patent Application Publication No. 20070185942 published in 2007 (inventor Hitz, David) discloses an Allocating files in a file system integrated with a RAID disk sub-system. Integrating a file system with a RAID array that exports precise information about the arrangement of data blocks in the RAID subsystem. The invention uses separate current-write location (CWL) pointers for each disk in the disk array where the pointers simply advance through the disks as writes occur. The invention writes on the disk with the lowest CWL pointer. A new disk is chosen only when the algorithm starts allocating space for a new file, or when it has allocated N blocks on the same disk for a single file. A sufficient number of blocks are defined as all the buffers in a chunk of N sequential buffers in a file. The result is that CWL pointers are never more than N blocks apart on different disks, and large files have N consecutive blocks on the same disk.

US Patent Application Publication No. 20070168399 published in 2007 (inventor Schultz, Thomas) discloses an Exposed sequestered partition apparatus, systems, and methods. Apparatus, systems, methods, and articles may operate to store one or more parameters associated with a pseudo-device in a device configuration table associated with a first partition within a multi-partition computing platform. An inter-partition bridge (IPB) may be exposed to an operating system executing within the first partition. The IPB may be adapted to couple the first partition to a second partition sequestered from the first partition. The IPB may be configured by the parameter(s) associated with the pseudo-device. Other embodiments may be described and claimed.

U.S. Pat. No. 6,549,980 published in 2003 (inventor Landau, Richard B.) discloses a Manufacturing process for software for software raid disk sets in a computer system. A method of manufacturing a computer includes creating a reference two-disk software RAID pair, the software RAID pair having desired partitions mirrored by an operating system. The method also includes extracting a master image from one disk of the reference disk pair, performing a difference comparison of partitions of a target disk of the reference disk pair against the master image and obtaining a collection of differences. The method further includes writing the master image to each disk of a disk set in the computer being manufactured and applying the collection of differences to a target disk of the disk set.

U.S. Pat. No. 6,904,497 published in 2005 (inventor Beckett, Peter H) discloses a Method and apparatus for extending storage functionality at the bios level. A method and apparatus for implementing RAID through control of the IO channels on the motherboard is provided. One exemplary method locates IO channels on a motherboard. Next, the IO channels on the motherboard are controlled where the IO channels are configured to communicate with a storage media. Then the storage media associated with the IO channels is managed as a RAID. Some notable advantages of the discussed methods and apparatuses include the simplicity of implementing the host based RAID through existing infrastructure contained within a computing system. Additionally, the added benefits of improving reliability and system performance associated with a RAID subsystem are made available in a cost effective manner because most of already existing infrastructure.

U.S. Pat. No. 6,065,096 published in 2000 (inventor Brian A. day) discloses an Integrated single chip dual mode raid controller. A RAID controller integrated into a single chip. The RAID controller chip includes a general purpose RISC processor, memory interface logic, a host CPU PCI bus, at least one back-end I/O interface channel, at least one direct memory access (DMA) channel, and a RAID parity assist (RPA) circuit. The RAID chip enables higher integration of RAID functions within a printed circuit board and in particular enables RAID function integration directly on a personal computer or workstation motherboard. The back-end I/O interface channel is preferably dual SCSI channels. The RAID chip is operable in either of two modes. In a first mode, the chip provides pass through from the host CPU interface directly to the dual SCSI channels.

This first mode of operation, a SCSI pass-through mode, allows use of the chip for non-RAID storage applications and enables low level manipulation of the disk array in RAID applications of the chip. The first mode of operation permits use of the chip without change to host applications and drivers. Rather, the chip is operable in a manner compatible with known available SCSI controller devices. The second mode of operation, a RAID control mode, provides full RAID management features to the attached host CPU. In the preferred embodiment, the RAID chip presents an Intelligent I/O (I2O) interface to the host CPU to enhance portability and performance of the host/RAID interaction.

Generally, redundancy in data processing apparatuses has been used to improve fault tolerance, reliability, and manufacturing yield. Computers have been built with redundant elements, such as data storage disks, to prevent the loss of data in the event of a hardware failure. Computers have also been built with redundant elements, such as processor chips, to provide for automatic replacement of an element that fails during use, or to provide for error detection by executing instructions in "lockstep," meaning that instructions are executed redundantly. Computer chips including circuitry that may be arranged as arrays, such as memories, have been built with redundant columns that may be used to replace columns that include manufacturing defects or fail as a result of use. However, the use of redundancy within processor chips has been limited by the dense, irregular nature of the transistor layout in processors. An attempt to solve the above problem is described in US Patent Application Publication No. 20060212677 published in 2006 (inventor T. Fossum). The publication describes embodiments of a multi-core processor having active and inactive execution cores. In one embodiment, an apparatus includes a processor having a plurality of execution cores on a single integrated circuit, and a plurality of core identification registers. Each of the plurality of core identification registers corresponds to one of the execution cores to identify whether the execution core is active.

However, as has been mentioned above, all the above implementations are either expensive solution where they need specialized hardware or some of them adversely affect the I/O performance where the RAID operation is done in software. More specifically, in order to improve I/O performance, the system may require expensive solutions such as hardware RAID controllers. None of the above inventions has the inexpensive solution of using one of the independent cores of the main multi-core CPU which is the heart of the computer system for RAID processing and this processing power is always available in present day computer systems with multi-core CPU.

Above we have described various implementations of the RAID solution, showed that the I/O processor is a main component of a hardware RAID controller and that the existing RAID solutions have disadvantages. It also should be noted that the above-mentioned known multi-core processors, e.g., a dual-core processors, also suffer from a number of disadvantages, one of which is that they are not used to their full potentials so that a part of their capacities remains unused for other possible applications.

OBJECTS AND SUMMARY OF THE INVENTION

It is an object of the present invention to provide RAID on a multi-core CPU wherein one of the cores is isolated from any OS installed on the system and is used as a RAID engine. It is another object of the invention to simplify the structure and manufacturing of a motherboard by eliminating the use of a separate RAID controller and replacing its function with a special flash memory. It is a further object to reduce the cost of the RAID solution by eliminating a special hardware RAID controller. It is another object to provide a method for improving the I/O performance as compared to conventional hardware RAID solutions. It is a further object to simplify connection of additional protocol-specific storage chips such as SAS, SATA, etc. It is another object to improve a performance by using one of core of a multi-core CPU as compared to the use of hardware RAID controller which is based on an existing I/O processor. It is a further object to provide a system that can be efficiently employed for increased accessibility and protection of critical data on enterprise level RAID solutions.

The essence of the invention is very simple. It consists of the fact that the entire RAID stack runs on a dedicated core of one of the cores of the multi-core CPU. In case of a dual-core CPU, one of the cores is used for the above purpose. This core will be masked from the OS and can be used to run a complete RAID stack on it with exceptional throughput and performance. Such an isolation of one of the cores will not essentially affect the performance of the OS since practically none of the existing server software uses more than one core for processing so that the inclusion of the second or subsequent cores that form a multi-core CPU may be justifiable only in rare cases of very specific applications.

BRIEF DESCRIPTION OF DRAWINGS

FIG. 1 is a diagram of a conventional hardware design of the I/O processor-based RAID controller.

FIG. 2 is a typical Dual Core Mother Board available in the market.

FIG. 3 is a flow chart that shows a conventional System Bios Boot sequence.

FIG. 4 is a scheme that shows details of the conventional BIOS PCI Scan.

FIG. 5 is a scheme that shows the architecture of the present invention for presenting the USB Flash as a virtual PCI Device to the Host system.

FIG. 6 is a flow chart that shows the RAID BIOS Initialization sequence in the system of the invention.

FIG. 7 shows the Host Driver interface to the RAID on CPU with a virtual PCI Express device interface proposed by the present invention.

FIG. 8 shows the memory sizing for the RAID on CPU disk cache support proposed by the present invention.

FIG. 9 is a view that shows enterprise level RAID on multi-core CPU of the present invention.

DETAILED DESCRIPTION OF THE INVENTION

In the subsequent detailed description of the invention, only those parts and units will be designated by reference numerals and shown in the drawings, which are essential for understanding the invention and to which references, are to be made in the description of the operation.

A block diagram of a motherboard inside a computer designated by reference 121 that incorporates the RAID on a multi-core CPU is shown in FIG. 2. As can be seen from the drawing, the motherboard, which is a conventional one and designated by reference 120, contains a multi-core CPU 122 that in this example incorporates a dual-core structure consisting of a first core (hereinafter referred to as "Core0") and a second core (hereinafter designated as "Core1"), both being located on a single die.

The heart of the computer motherboard is the aforementioned CPU 122. Data transfer between the CPU 122 and other components like DDRII 136, hard disk 138 on the motherboard 120 is done using several buses on the motherboard such as FSB 124, an I/O bus 126, a PCI bus 128, memory bus 129, etc.

Connection of the buses 124, 126, and 128 with different speeds and bandwidth on a motherboard 120 is achieved using special controllers called bridges. These are a North Bridge 130 and a South Bridge 132. The CPU 122 is connected to the North Bridge 130 via a Front Side bus 124. The North Bridge 130 contains a memory controller 134.

The North Bridge 130 acts more over like a data traffic switch and controls the flow of data between the fast devices like CPU 122, RAM 136, the South Bridge 132, etc.

All the controllers, which handle slow devices, are built into the South Bridge 132. For example, the South Bridge 132 transfers the data to and from a hard disk 138 and all the other I/O devices such as USB devices, network devices (not shown) and passes these data into the I/O bus 126, which is connected to the North Bridge 130.

The South Bridge 132 handles different controllers such as those listed below (which are not all shown in order to simplify the drawing):

1) PCI Controller that can be of different types such as a PCI SAS controller 140, PCI SATA controller 142, etc.

2) Super I/O: The Low Pin Count (LPC) Bus 143 provides a data and control path to a Super I/O 144 (the normal attachment for keyboard, mouse, parallel port, serial port, IR port, and floppy controller) and BIOS ROM (flash ROM) (where BIOS stands for Basic Input/Output System).

3) DMA Controller: The DMA (Direct Memory Access) controller allows ISA (Industry Standard Architecture) or LPC devices direct access to main memory without needing help from the CPU.

4) Interrupt Controller: The interrupt controller provides a mechanism for attached devices to get attention from the CPU.

5) IDE (PATA) Controller: The IDE (PATA) (Integrated Drive Electronics or Parallel Advanced Technology Attachment) interface allows direct attachment of system hard drives.

6) Real Time Clock (RTC): The real time clock provides a persistent time account.

7) Power management (APM and ACPI). The APM (Advanced Power Management) or ACPI (Advance Configuration and Power Interface) function is provide methods and signaling to allow the computer to sleep or shut down to save power.

8) Nonvolatile BIOS memory: The system CMOS, assisted by battery supplemental power, creates a limited non-volatile storage area for system configuration data.

9) A Universal Serial Bus (USB): USB controller 148 (FIG. 2) provides high-speed serial interface to serial peripheral devices using the standardized USB interface.

10) Ethernet Controller (designated by reference number 146 in FIG. 2): Provides the fast Ethernet support.

Depending on specific applications, the South Bridge 132 can handle other controllers, which are not mentioned herein.

The motherboard 120 and the elements thereof described so far are the same as in any conventional multi-core system.

The motherboard boot sequence will now be described.

In order to understand the principle of the invention and improvement offered by the invention, it is important to get familiar with the motherboard boot sequence which is done by the motherboard BIOS and which will now be described with reference to FIG. 3, which is a flow chart of the booting operation.

Immediately after the computer is powered on, the following happens:

1) Power on Start (Step 1): All the computers are powered using a Switch Mode Power Supply (SMPS), which makes sure that the power supplied to the CPU 122 and motherboard 120 (FIG. 2) is reliable. In a multi-core CPU environment the system BIOS can select any one of the CPU cores, i.e., Core0 or Core1, as a bootstrap processor, which will be responsible for initializing the entire motherboard hardware and all other CPU cores. It is responsibility of the chipset to generate a reset signal (Step 2) to the selected bootstrap core, which in this case is Core0, after the chipset receives a Power Good signal from the power supply (not shown).

2) BIOS "Power On Self Test (POST) (Step 3)": Every system BIOS performs a Power on Self Test (POST), during which the hardware is diagnosed for potential hardware errors. On any error, the system halts.

3) Video BIOS (Step 4): Once the POST is completed, it is time for the system BIOS to configure the video card (not shown). The system BIOS now looks for the built in video BIOS on the video card and executes the video BIOS program.

4) Option ROM (Step 5): The system BIOS then looks for other devices like network controller 146 (FIG. 2), SAS controller 140, and SATA/IDE/ATA controller 142 which generally have option ROMs to see if any of them has their own initialization code or BIOS. If any of the devices has an option ROM and the first two offsets is 0x55 0xAA, the system BIOS identifies them as valid BIOS and executes the aforementioned BIOS programs.

5 Allocation of PCI Memory Addresses (Step 6): All the PCI devices identified in Step 5 allocate the PCI memory addresses.

6) Memory Test (Step 7): After displaying the startup screen, the system BIOS performs the memory test on the entire system memory to identify any memory errors. System BIOS halts on errors with an error message displayed on the console.

7) Setup COM Ports (Communication Ports) and LPT Ports (Step 8): The system BIOS now searches for the serial ports [COM], parallel ports [LPT]. Once detected, the devices are initialized.

8) Scan PCI Device (Step 9): The system BIOS now scans the PCI bus 128, initializes the detected PCI devices, and allocates resources to each PCI device detected.

9) Search Boot Device (Step 10): This is last step that the system BIOS performs before handing over the control to the OS. The system BIOS identifies the boot drive and transfers control to the OS.

Generally, all the ten steps are performed by the system BIOS and it need not to be performed in the same order, so that slight changes in the order are allowed depending on system BIOS providers. All the ten steps above mentioned are called as "cold reset boot sequence", which means that the system is started with power button on. In case of "warm reset boot" that is "Ctrl+Alt+Del" the POST is skipped and the boot process starts from Step 8 and ends at Step 10.

What has been described so far was the same as operations of conventional system components of a typical dual-core motherboard and its boot-up sequence.

The following description will relate to distinguishing features of the present invention.

Let us first consider in more detail Step 9 of FIG. 3 with reference to FIG. 4, which is a more detailed flowchart of this step.

As part of Step 9, the system BIOS scans all the PCI devices and executes the option ROM BIOS on it (Step 9-1). Along with other PCI devices, the system BIOS will identify the USB controller 144 (FIG. 2) and in addition to the execution of the option ROM (Step 9-2), it should scan the USB devices sitting on the USB controllers. As a part of scanning of the USB devices, the following sequence of operations, which is a novel feature inherent in the present invention, is performed. In particular, in Step 9-3, the USB ports are initialized. For each device, which is connected to the USB port and has a memory, the location zero and one of the memory is checked (Step 9-4) for a BIOS signature. If the signature matches the value 0x55 0xAA, Step 9-5, which is execution of option ROM BIOS on USB memory, is carried out. This sequence is continued for all the USB devices found.

Having described the method part of the present invention, let us consider a hardware part that is needed for performing the above-described operations. In general, the most important element of the method and device of this invention is a USB flash chip 150 with a program, which converts one of the multi-core processors, i.e., Core1 (FIG. 2) into a powerful RAID engine. A part of this program has been already described in the form of a flowchart shown in FIGS. 3 and 4. The remaining part will be described below. The aforementioned USB flash chip 150, which in general is designated by reference numeral 200, is shown in FIG. 5 which illustrates the architecture of the memory layout that can be understood by the above-described system BIOS, in order to configure the environment required for realization of the method of the invention. As had been mentioned above, a conventional hardware RAID controller need to use, among other things, a Flash chip and NVRAM which are connected to the I/O processor through the local bus. With the use of the USB flash chip 200 of FIG. 5, the aforementioned Flash chip and NVRAM become unnecessary since a part of the memory of the USB flash chip 200 will fulfill the functions of the aforementioned elements. In other words, both hardware elements such as Flash chip and NVRAM are replaced by a single hardware element, i.e., USB flash chip 200.

In other words, in a conventional RAID controller shown in FIG. 1, there is NVRAM 28, which is Non Volatile RAM, used to store data even when there is no power. In the RAID on CPU of the present invention, we have the USB flash memory 150 in FIG. 2, which can also store data without power. In the case of the invention, we use some portion of the flash memory as the NVRAM and store the RAID specific information in this area which is needed during reboot of the system or for recovery from power loss situations.

Another important feature of the invention is that majority of the flash memory can be used to hold the entire RAID disk cache data in case of sudden power loss. In the USB flash memory 200 of FIG. 5 only about 20 MB is used for RAID firmware code and NVRAM data and the rest of the 2 GB is used for this feature. Using this idea we can avoid having the battery backup module 30 used in conventional RAID card shown in FIG. 1. The exact mechanism of implementation of the logic to transfer the cache data to the USB flash 150 in FIG. 2 in case of power loss is out of the scope of this invention.

The conventional function of a DMA is to move data from one address to another address without the involvement of the CPU. To achieve that, DMA uses cycle stealing method. There is a DMA facility available on the South Bridge to off-load the I/O devices (slow devices) that are sitting on the South Bridge.

There is no DMA on the North Bridge or the memory controller because the CPU and the devices on the North Bridge are faster devices, and the CPU can move data needed instead of wasting time in configuring and starting the DMA for data movement. This makes sense in a conventional structure where a single processor is sharing FSB.

In a multi-core environment, the FSB is shared by multiple processor cores. Sharing of same FSB will not make much difference when the data transfers are of a smaller size, but let us assume a situation when one of the cores of the multi-core CPU needs to transfer bulk data all the time as is the case of a RAID application. The drawback that will occur under this condition is that if one core is operating on a particular address space and at the same time another core needs access to a different address space which does not collide with the first one, then the other core has to wait till the FSB is released by the first core. Therefore, the use of DMA 300 on the North Bridge 302 of FIG. 8 or memory controller, the FSB can be used much more efficiently by the multiple cores. This is not a compulsory requirement for the RAID on CPU but it just another way to improve the performance in a multi-core environment.

As shown in FIG. 5, the memory of the USB flash chip 200 consists of three main sections: 1) RAID BIOS 202; 2) PCI Expansion ROM Data Structure 204; and 3) Vendor Specific Information Data Structure Format 206 for the RAID on the selected Core1 of the multi-core CPU 22 (FIG. 2).

The vendor specific area of the PCI header has parameters required for the system BIOS to allocate memory size for RAID cache and mask it from OS. The number of SAS PCIX devices has to be masked from OS and their vendor IDs/device Ids also need to be stored in this area.

Furthermore, the system BIOS should scan all the USB devices while scanning for the PCI devices. Upon finding a valid PCI BIOS Signature (0x55 0xAA), it has to check at offset 0x00000018 to see if it has a valid offset (other than 0xFFFF) to the to PCI header structure. If it finds a valid PCI header offset, it reads the PCI header data structure from that offset.

The content of PCI ROM BIOS header is shown in Table 1. This table represents the data structure that is present at the beginning of the USB flash.

TABLE 1

PCI ROM Header Data Structure Format on the USB flash

| Data | Byte Offset | Comments |
|---|---|---|
| 0x55 0xAA | 0x00-0x01 | Signature: to confirm it is an option ROM BIOS |
| 0x40 | 0x02 | BIOS size in 512 sectors |
|  | 0x03 | Call BIOS Init |
| "cpuRAID" | 0x04-0x17 | Vendor specific string |
| 0x001C | 0x18-0x19 | Offset to the PCI header structure, set to 0x1C |
| 00 00 | 0x1A-0x1B | Pad Bytes |
|  | 0x1C-0x34 | PCI header structure |

The sequence of operations performed on the aforementioned memory will be shown and described in more detail below with reference to the flowchart shown in FIG. 6. At this stage it should be mentioned that the 0x00 location of the flash memory contains the aforementioned two bytes PCI BIOS signature (0x55 0xAA), which is needed for the system BIOS to understand that there is a PCI BIOS sitting on the USB device 200. The system BIOS should look at the offset 0x18 for a valid PCI Expansion ROM data structure offset which is 0x001C in our case, which tells the system BIOS that there is a valid PCI expansion ROM data, and BIOS has to read from offset 0x1C to get the PCI Expansion ROM data structure of the RAID on Core1, which is shown in FIG. 5.

Table 2 is a more detailed description of the PCI Expansion ROM data structure mentioned on the last line of Table 1 and needed for understanding of the flowchart shown in FIG. 6.

TABLE 2

PCI Expansion ROM Data Structure Format

| Byte Offset | Comments |
|---|---|
| 0x00-0x03 | Signature: "P C I R" (50 43 49 52) |
| 0x04-0x05 | Vendor ID |
| 0x06-0x07 | Device ID |
| 0x08-0x09 | Pointer to vital product data |
| 0x0A-0x0B | PCI data structure length (18 00) |
| 0x0C | PCI data structure revision |
| 0x0D | Programming interface code |
| 0x0E | Subclass code |
| 0x0F | Class code |
| 0x10-0x11 | Image length in 512 bytes |
| 0x12-0x13 | Revision level of code/data |

TABLE 2-continued

PCI Expansion ROM Data Structure Format

| Byte Offset | Comments |
|---|---|
| 0x14 | Code type (01) |
| 0x15 | Indicator byte. For last image (80) |
| 0x16-0x17 | Reserved bytes |
| 0x18- | Vendor Specific Information for RAID on CPU |

Table 2 represents the format of the data structure of the PCI expansion ROM, which holds all the information for creating a Virtual PCI device and vendor specific information. The BIOS has to read the PCI expansion ROM data structure at offsets 0x04 and 0x06 to know the "Vendor ID" and "Device ID" of the virtual PCI device that the system BIOS has to create for the RAID on CPU.

FIG. 6 shows a flowchart of Steps that are more detailed subdivision of Step 9-5 of the flowchart shown in FIG. 4. It should be reminded that Step 9-5 is execution of option ROM BIOS on USB device memory.

More specifically, in Step 9-5-1, which follows the start after completion of Step 9-4 (FIG. 4), the system BIOS will read the PCI header and Vendor specific area from the memory of the USB flash 200 as described in above-mentioned Tables 1 and 2, respectively. In Step 9-5-2 the system BIOS reads the vendor specific data structure from the offset 0x18 of the PCI expansion ROM data structure. This operation provides such critical information as the CPU ID of the core to be masked, which in the illustrated embodiment is Core1, as well as the number of PCI slots to be hidden and used later for SAS/SATA/SCSI HBA (Host Bus Adapters) and a size of the memory to be allocated for the RAID engine.

Next step is Step 9-5-3 which is masking of one core of the multi-core CPU from the operating system (OS). This masking can be carried out in different ways; one way is to modify the Multi-Processor (MP) table. The MP table is created by the system BIOS after detection of all the cores in a Multi-Core CPU. The other way could be by modifying the system information in the Advanced Configuration and Power Interface (ACPI) table.

According to the invention, one of the cores, which in the illustrated embodiment is Core1 of the multi-core CPU 122 (FIG. 2) on a single die, is dedicate to a particular application, and the best place to do that is again during the system BIOS initialization.

The I/O processor 22 (FIG. 1) normally used for a RAID controller is not only a processor but contains dedicated hardware engine like DMA engine, which transfers data to/from the system memory to the RAID cache, a separate XOR engine to perform parity calculations which is a computationally intensive job, and a processor core itself which performs the arithmetic and logical operations. The I/O processor generally operates at 400 MHz to 600 MHz at maximum; hence it needs a separate hardware to perform other jobs like DMA and XOR. All said above relates to a conventional structure.

But if we consider one of the CPU cores in the multi-core processor, it should be noted that this core operates as minimum at 1.5 GHz, which has greater processing power. Due to this extraordinary processing power we don't need a dedicate XOR engine (a process or set of instructions that calculates data bit relationships in a RAID subsystem) or DMA engine in case of RAID on CPU. Even if we use software XOR for a RAID6 parity calculation on this CPU, we may be consuming only 300 MHz power of the CPU core, which is an ample processing power for the RAID application.

In Step 9-5-4, the dedicated Core1 is exposed as a PCI device to the OS so that the OS device driver can communicate with the RAID application. This is achieved by creating a virtual PCI device by the option ROM BIOS.

Exposing a particular piece of memory in the RAM as a PCI device can be done by the device driver or by the system BIOS. In the case of the present invention this is performed more efficiently at the system BIOS during the execution of Step 9-5-4 of option ROM BIOS in FIG. 6, since the device driver is dependent on the OS. One way to expose the claimed virtual PCI device memory to reside on the PCI bus is by modifying the Differentiated System Descriptor Table (DSDT) in the ACPI Specification in order to represent the claimed memory as a part of the system PCI bus hierarchy. Another way to reside the claimed memory on the PCI bus is to modify the BIOS description of the memory itself.

FIG. 7 shows that some of the claimed memory is utilized as the PCI configuration header 400, and the registers of the Core1 are mapped to the Base Address register 0 (BAR0). It is also shown that a IRQ (Interrupt ReQuest, the signal that a peripheral or program uses to interrupt the CPU) is routed to Core1 by updating the Advanced Programmable Interrupt Controller (APIC) routing table so that the OS can send Inter Processor Interrupts (IPI) messages between CPU cores. IRQ is generated as soon as the device driver writes a specific value to the Message Unit Register, which is a part of shared memory 402.

Once the virtual PCI device resides on the PCI bus, the OS can recognize the Core1 as a PCI device and, hence, can load a device driver on the PCI device. In case of Windows OS this is done by adding a PnP (Plug and Play) Id to the .inf files. The operating system can even generate interrupts to Core1 using IPI messages. Hence a full-fledged communication between the Core1 and OS is established.

What we have just described is known. What is novel in this design is that the front-end bandwidth of the RAID engine (RAID on CPU) is equal to bandwidth of the FSB 124 (FIG. 2). In a conventional architecture shown in FIG. 1, the aforementioned bandwidth is restricted by number of lanes of PCIE bus 29 on which the RAID controller is sitting.

In Step 9-5-5 of FIG. 6, a required memory (approximately 256 MB to 2 GB depending on how much RAID disk cache is configured by the user) is dedicated to Core1 to perform the RAID operation. This dedicated memory is masked from other cores, so that OS cannot see the isolated memory.

There is a number of ways to mask the memory from the operating system. One of the ways the masking can be performed is by modifying MP tables during system BIOS initialization by the option ROM BIOS as shown in Step 9-5-5 of FIG. 6. There can be many other ways that are not discussed here.

FIG. 8 illustrates the way by which we can allocate and dedicate some memory for the selected Core1. The assumption is that the user understands that he/she needs to add RAM for RAID on CPU purpose also and he/she knows exactly how much memory is needed to use for RAID on CPU. The amount of memory needed to be reserved for RAID on CPU goes as a configuration parameter into the USB flash memory in the vendor specific area 206 as shown in FIG. 5. This memory is used for RAID on CPU and RAID disk cache.

In the next Step 9-5-6, changes are made to the BIOS so that it can mask some of the PCI-X slots (depending on how many SAS/SATA/SCSI controllers 140/142 (FIG. 2) are planned to be used by the user) from the OS. IRQs for these PCI-X slots are routed only to the dedicated Core1 and not to the other CPU cores.

The SAS/FC controllers are protocol specific hardware that provide connectivity to the actual storage media (SAS/SATA/FC hard disk). Usually this controller can be mounted on the motherboard PCI-X slot such as a slot 141 shown in FIG. 2 as an HBA (Host Bus Adapter) 140 as shown in FIG. 2.

Once the RAID on CPU claims the device, firmware code on the RAID on CPU will communicate with these controllers via a standard driver interface. Many such PCIX devices can be supported and all these controllers can be from different vendors.

In Step 9-5-7 of FIG. 6, the BIOS code running on Core0, will load the RAID firmware code from the USB flash memory 150 in FIG. 2 to the memory allocated for Core1 in Step 9-5-5. It will initialize the code and data area in that memory and start the execution of Core1 code from that code loaded. The BIOS code running on Core0, will complete execution of Step 9-5 in FIG. 4 and continue as shown in the flowchart in FIG. 4 and Step 10 of FIG. 3.

The RAID on a multi-core CPU according to the invention may be advantageously used in enterprise level RAID applications. More specifically, in the modern world, data protection and security is taking a high priority, and hence the storage industry is moving toward providing the enterprise level customers, like financial institutes (Banks), database centers, with different level of protection against data losses, etc. RAID provides data protection and performance locally on the media like hard disks, but this will not solve the problem if the entire location is in danger. For example, if the building in which the data center is installed is struck with an earthquake or fire disaster, there is no way the RAID is going to protect against these natural disasters. To address this kind of problems, the storage industry provides a software solution on top of RAID called "Storage Virtualization". Storage Virtualization is nothing but a software stack built on top of the RAID with following set of features:

Replication: It is a mechanism through which the same data base center can be located in two or more different geographical locations. This is possible because all the replicate databases are connected through Ethernet (network) and each location maintains an exact copy of the database. Any write targeted to one database should be written to all the other databases and read can happen from the nearest database located.

Snapshot: Snapshot is a facility given to the administrator to take the snapshot of the entire database at any given point of time and back it up in the reserved area provided for the Snapshot itself. It is mainly for providing fast backups.

Continuous Data Protection (CDP): It is mechanism by which in a storage system all the data in an enterprise is backed up whenever any change is made to the data. We can think of this like a journal of complete storage of snapshots for every instant in time that a modification happens to the data in the database. The major advantage of CDP is that it preserves a file for every transaction that takes place in the enterprise. Hence if some file is corrupted, we can always recover the most recent clean copy of the affected file.

Thin Provision: Thin provision is a mapping technique by which we can provide the user with larger memory space than the actual physical disk space is available. This technique is invented by 3PAR technologies. Thin Provisioning solves this under-utilization problem by breaking the traditional linkages between allocated and purchased capacity. Leveraging dedicate-on-write capabilities, Thin Provisioning allows IT departments to safely allocate as much logical capacity to an application as is conceivably needed over its lifetime once! Meanwhile, physical capacity is drawn from a common pool of purchased storage only on an as-needed basis. That is, only when an application truly requires capacity for its written data, is it drawn from the pool.

Data De-duplication: It is just like a compression technique that helps in reducing storage needs by eliminating redundant data by having only one unique instance of the data retained on storage media, such as disk or tape. Redundant data is replaced with a pointer to the unique data copy.

All the above-mentioned features can be collectively provided with a software solution, which can run on a single core (Core3) of the multi-core CPU 500 as shown in FIG. 9, as a simple device driver. Hence we need an embedded operating system for providing such features. Since an enterprise level customer will be dealing with huge database system, it requires different types of connectivity to the front end of the data base subsystem. The front-end connectivity can be either iSCSI, Fiber Channel, SAS, Host bus or all of them together as shown by numeral 504 in FIG. 9.

All the previous discussion have shown that we can run RAID on one of processor and to achieve the enterprise level support we need one more core (Core3 in FIG. 9) of the multi-core CPU, where we will execute an embedded OS like Linux micro-kernel. As shown in FIG. 9, the invention has taken two cores of the CPU (Core2 and Core3), and uses one core (Core2) to run the RAID stack and the other core (Core3) to run iSCSI/iPSec, front end HBA like SAS, Fiber channel drivers and storage virtualization software on Linux Micro-Kernel. The actual storage media connected to the RAID is presented to the enterprise "Storage Virtualization" stack as Logical Unit Numbers (LUNs) and each LUN is connected to a specific front end interface (iSCSI, SAS, Fiber channel, or to Host Bus). Different LUNs connected to different front-end interfaces (iSCSI, SAS, Fiber channel, etc) can be protected from each other by using LUN masking technique. The Main Enterprise OS running on the system will use the other cores, Core0 and Core1 in this case.

Thus it has been shown that the present invention provides a RAID on a multi-core CPU wherein one of the cores is isolated from any OS installed on the system and is used as a RAID engine. The invention reduces the cost of the RAID solution by eliminating a special hardware RAID controller by using components from the motherboard.

In other words, a computer equipped with the apparatus of the invention is free of the hardware RAID controller, and one of the cores in combination with a flash memory chip replace the function of the hardware RAID controller conventionally used in a computer.

Furthermore, the invention provides a method for improving the I/O performance as compared to conventional hardware RAID solutions, simplifies connection of additional protocol-specific storage chips such as SAS, SATA, etc., improves performance by using one of core of a multi-core CPU with much higher processing power as compared to that of an I/O processor in case of the conventional hardware RAID controller, and provides a system that can be efficiently employed for increased accessibility and protection of critical data on enterprise level RAID solutions.

Although the invention has been described with reference to specific examples and drawings, it is understood that these examples and drawings should not be construed as limiting the application of the invention and that any changes and modifications are possible without departure from the scope of the attached patent claims. For example, although the Flash memory was described as a USB flash memory, it can be made in the form of a chip permanently sitting on the motherboard or it can use a different interface other than USB. The invention is applicable to computers of different types starting from desktop Personal Computer (PC), big database servers and even laptops with multiple drives. The invention should not be restricted only to run RAID applications on the isolated core and is applicable to any other computationally intensive job like the job that runs on a video controller, meaning that one core of a multi-core system can be isolated and used as a high-end video processor.

The invention claimed is:

1. An apparatus for use of a masked CPU core as a RAID controller comprising:
a computer having a motherboard that supports a plurality of data storage disks, a central processing unit having a plurality of cores, an I/O bus that is connected to the data storage disks, and a flash memory chip that stores the RAID firmware code and acting as backup in case of power cycle or power failure;
the flash memory chip containing a program that masks at least one of the cores of the plurality of cores thus forming at least one masked core.

2. The apparatus of claim 1, wherein the program that masks said at least one of the cores is selected from a PCI BIOS program and/or a Motherboard System BIOS program.

3. The apparatus of claim 2, wherein the multi-core central processing unit is a dual-core central processing unit.

4. The apparatus of claim 2, further provided with a second core masked from said plurality of cores that is used for storage virtualization stack by receiving data from at least one outside source and for feeding the received data to said at least one of the cores.

5. The apparatus of claim 2, wherein a part of the memory of the flash memory chip is used instead of a battery back up module.

6. The apparatus of claim 1, further provided with a second core masked from said plurality of cores that is used for storage virtualization stack by receiving data from at least one outside source and for feeding the received data to said at least one of the cores.

7. The apparatus of claim 1, wherein a part of the memory of the flash memory chip is used instead of a battery back up module.

8. A method for use of one of the cores of a multi-core central processing unit as a RAID controller comprising the steps of:
providing a computer having a motherboard that supports a plurality of data storage disks, data storage chips, a central processing unit having a plurality of cores, an operating system, a system BIOS having a program, an I/O bus that is connected to the data storage disks connected to said data storage chips, random access system memory, and a flash memory chip that has a program and stores aforementioned RAID firmware code;
masking at least one of the cores of the plurality of cores by using a program selected from said program of the aforementioned flash memory chip and/or a program of the system BIOS; and
controlling operation of the RAID firmware code independently from other cores of said plurality by means of said one of the cores.

9. The method of claim 8, wherein the step of masking at least one of the cores of the plurality of cores comprises:
isolating said at least one of the cores from the operating system;
isolating some of the motherboard random access system memory from the operating system;
isolating the storage chips from the operating system; and
using the items mentioned in the isolating steps for running the RAID firmware code on said at least one of the cores.

10. The method of claim 9, further comprising a step of reading information from the flash memory by scanning the flash memory chip with use of the system BIOS.

11. The method of claim 8, wherein the step of controlling of the RAID firmware code independently from other cores comprises exposing said at least one of the cores as a PCI device so that the operating system can communicate with the RAID firmware code of said at least one of the cores.

12. The method of claim 11, wherein exposing the said at least one of the cores as a PCI device is carried out by storing a PCI device information on the said flash memory chip.

13. The method of claim 12, further comprising a step of reading PCI device information from the flash memory by scanning the flash memory chip with use of the system BIOS.

14. The method of claim 12, further comprising a step of using a part of the memory of the flash memory chip as NVRAM, while the remaining memory of the flash memory chip is used for storing RAID cache data which allows avoiding a battery back-up module.

15. The method of claim 8, further comprising a step of reading information from the flash memory by scanning the flash memory chip with use of the system BIOS.

16. The method of claim 15, further comprising a step of using a part of the memory of the flash memory chip as NVRAM, while the remaining memory of the flash memory chip is used for storing RAID cache data which allows avoiding a battery back-up module.

17. The method of claim 8, further comprising a step of using a part of the memory of the flash memory chip as NVRAM, while the remaining memory of the flash memory chip is used for storing RAID cache data which allows avoiding a battery back-up module.

* * * * *